United States Patent
Liao et al.

(10) Patent No.: US 10,311,185 B2
(45) Date of Patent: Jun. 4, 2019

(54) MODEL-BUILDING METHOD AND MODEL-BUILDING SYSTEM

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Hsin-Hsiung Liao, Hsinchu (TW); Min-Hsiu Tsai, Hsinchu (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 108 days.

(21) Appl. No.: 15/709,463

(22) Filed: Sep. 19, 2017

(65) Prior Publication Data

US 2018/0330033 A1    Nov. 15, 2018

(30) Foreign Application Priority Data

May 12, 2017    (CN) .......................... 2017 1 0331862

(51) Int. Cl.
    *G06F 17/50*    (2006.01)
(52) U.S. Cl.
    CPC ........ *G06F 17/5031* (2013.01); *G06F 17/505* (2013.01); *G06F 17/5059* (2013.01)

(58) Field of Classification Search
    CPC . G06F 17/5031; G06F 17/505; G06F 17/5059
    See application file for complete search history.

(56) References Cited

U.S. PATENT DOCUMENTS 7,039,887 B2 *   5/2006   Khalil ................. G06F 17/5022
                                                       716/106
8,640,066 B1 *   1/2014   Gupta .................. G06F 17/505
                                                       716/102

* cited by examiner

*Primary Examiner* — Naum Levin
(74) *Attorney, Agent, or Firm* — CKC & Partners Co., LLC (57) ABSTRACT

A model-building method and a model-building system for executing the method are disclosed. The method includes the following steps: reading a first netlist; extracting a netlist between an input and an initial-stage clock multi-vibrator and extracting a netlist between a final-stage clock multi-vibrator and an output from the first netlist; extracting a netlist between the input and the output from the first netlist; extracting a netlist between a first clock multi-vibrator and a second clock multi-vibrator from the first netlist; extracting netlists between the first clock input and the initial-stage clock multi-vibrator and the first clock multi-vibrator from the first netlist; extracting netlists between the second clock input and the final-stage clock multi-vibrator and the second clock multi-vibrator from the first netlist; and generating a second netlist based on extracted netlists.

10 Claims, 8 Drawing Sheets

MODEL-BUILDING METHOD AND MODEL-BUILDING SYSTEM

RELATED APPLICATIONS

This application claims priority to China Application Serial Number 201710331862.6, filed May 12, 2017, which is herein incorporated by reference.

BACKGROUND

Field of Invention

The present invention relates to a data processing method and a data processing system. More particularly, the present invention relates to model-building method and a model-building system.

Description of Related Art

With the rapid development of model-building technology, an interface logic model (ILM) has been extensively employed in designs of integrated circuits (such as very-large-scale integration (VLSI)) and has played an increasingly important role. For example, the interface logic model can generate a simplified netlist through extracting a partial key netlist in the full netlist corresponding to the integrated circuit. Hence, the simplified netlist can serve as a simplified version of the key netlist to present the features of the full netlist. However, when an integrated circuit has multiple clock inputs, a traditional interface logic model can not present features and characteristics of the multiple clock inputs in the simplified netlist. As a result, an accurate static timing analysis (STA) for the integrated circuit having multiple clock inputs is difficult to be performed based on the simplified netlist. Although the above situation can be effectively improved through directly improving the interface logic model to extract a greater number of partial key netlists, this method is also likely to significantly increase the time spent on the static timing analysis.

For the foregoing reasons, there is a need to effectively improve the traditional interface logic model so as to support an accurate and efficient static timing analysis to design a model-building method and a model-building system.

SUMMARY

A model-building method and a model-building system for executing the model-building method is provided. The model-building system comprises a memory and a processor. The model-building method comprises: reading a first netlist from the memory by using the processor; extracting a first sub-netlist and a second sub-netlist from the first netlist by using the processor, the first sub-netlist being between an input and an initial-stage clock multi-vibrator, the second sub-netlist being between a final-stage clock multi-vibrator and an output; extracting a third sub-netlist from the first netlist by using the processor, the third sub-netlist being between the input and the output; extracting a fourth sub-netlist from the first netlist by using the processor, the fourth sub-netlist being between a first clock multi-vibrator and a second clock multi-vibrator, the first clock multi-vibrator being a front-stage clock multi-vibrator of the second clock multi-vibrator, the first clock multi-vibrator being coupled to a first clock input, and the second clock multi-vibrator being coupled to a second clock input; extracting a fifth sub-netlist from the first netlist by using the processor, the fifth sub-netlist being between the first clock input and the initial-stage clock multi-vibrator or between the second clock input and the initial-stage clock multi-vibrator; extracting a sixth sub-netlist from the first netlist by using the processor, the sixth sub-netlist being between the first clock input and the final-stage clock multi-vibrator or between the second clock input and the final-stage clock multi-vibrator; extracting a seventh sub-netlist from the first netlist by using the processor, the seventh sub-netlist being between the first clock input and the first clock multi-vibrator; extracting an eighth sub-netlist from the first netlist by using the processor, the eighth sub-netlist being between the second clock input and the second clock multi-vibrator; and generating a second netlist based on netlists that are extracted by using the processor.

The invention provides a model-building system, and the model-building system comprises a memory and a processor. The memory is configured to store a first netlist and a second netlist. The processor is configured to read the first netlist from the memory, and the processor is configured to execute the following operations to generate the second netlist: extracting a first sub-netlist and a second sub-netlist from the first netlist, the first sub-netlist being between an input and an initial-stage clock multi-vibrator, the second sub-netlist being between a final-stage clock multi-vibrator and an output; extracting a third sub-netlist from the first netlist, the third sub-netlist being between the input and the output; extracting a fourth sub-netlist from the first netlist, the fourth sub-netlist being between a first clock multi-vibrator and a second clock multi-vibrator, the first clock multi-vibrator being a front-stage clock multi-vibrator of the second clock multi-vibrator, the first clock multi-vibrator being coupled to a first clock input, and the second clock multi-vibrator being coupled to a second clock input; extracting a fifth sub-netlist from the first netlist, the fifth sub-netlist being between the first clock input and the initial-stage clock multi-vibrator or between the second clock input and the initial-stage clock multi-vibrator; extracting a sixth sub-netlist from the first netlist, the sixth sub-netlist being between the first clock input and the final-stage clock multi-vibrator or between the second clock input and the final-stage clock multi-vibrator; extracting a seventh sub-netlist from the first netlist, the seventh sub-netlist being between the first clock input and the first clock multi-vibrator; and extracting an eighth sub-netlist from the first netlist, the eighth sub-netlist being between the second clock input and the second clock multi-vibrator.

In summary, the technical solution of the present invention has obvious advantages and beneficial effects as compared with the prior art. Through the above technical solution, considerable advances in technology and extensive industrial applicability can be achieved. The model-building method and model-building system according to the present invention extract the netlists corresponding to the initial-stage clock multi-vibrator and the final-stage clock multi-vibrator based on the input and the output, and extract the netlists corresponding to the first clock multi-vibrator and the second clock multi-vibrator based on different clock inputs so as to improve the traditional interface logic model. As a result, the model-building method and model-building system according to the present invention can effectively improve the traditional interface logic model (that is, the improved interface logic model can present features and characteristics of multiple clock inputs) so as to support accurate and efficient static timing analysis.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of devices with equivalent effects are within the scope of the present disclosure.

Figure 1:
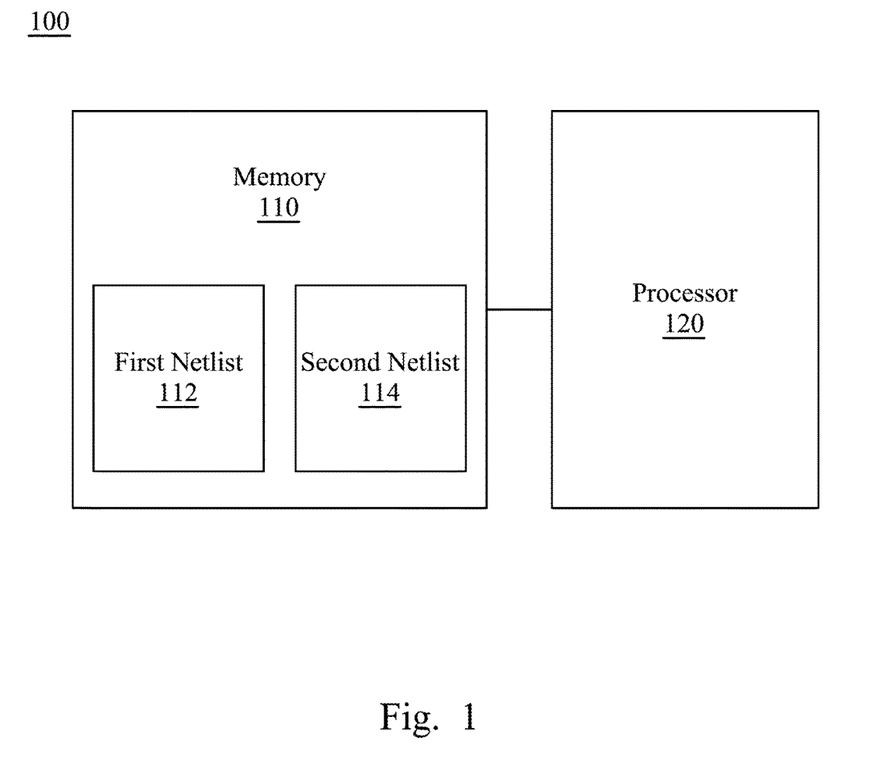
FIG. 1 depicts a block schematic diagram of a model-building system according to one embodiment of this invention.

FIG. 1 depicts a block schematic diagram of a model-building system 100 according to one embodiment of this invention. As shown in FIG. 1, the model-building system 100 comprises a memory 110 and a processor 120, and the memory 110 is electrically connected to the processor 120. The memory 110 is configured to store a first netlist 112 and a second netlist 114. The processor 120 is configured to read the first netlist 112 from the memory 110 and process the first netlist 112 to generate the second netlist 114. For example, the memory 110 can be implemented by using a computer hard disk drive, a server, or any device having a data recording function. The processor 120 can be implemented by using a central processing unit, a microcontroller, or any device having a data processing function.

Figure 2A:
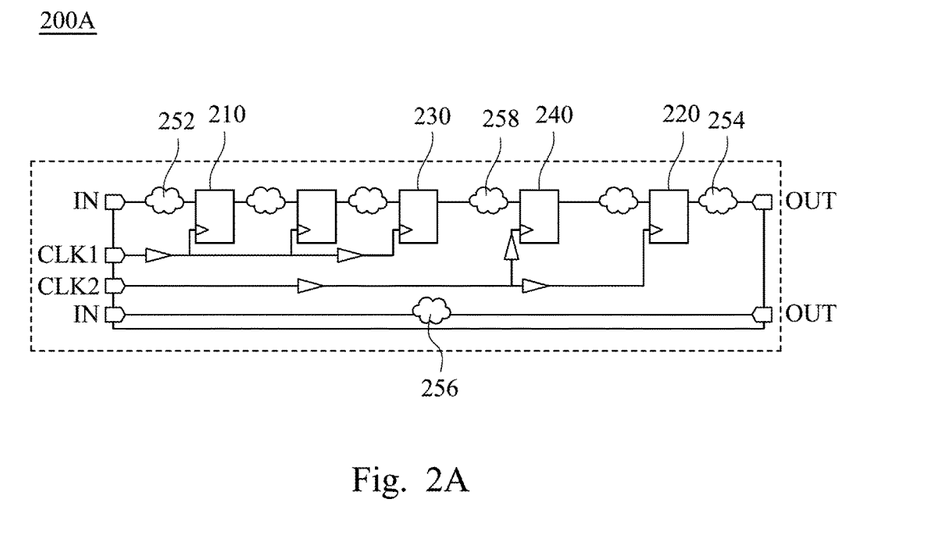
FIG. 2A, FIG. 2C, and FIG. 2E depict schematic diagrams of first netlists according to embodiments of this invention.
Figure 2B:
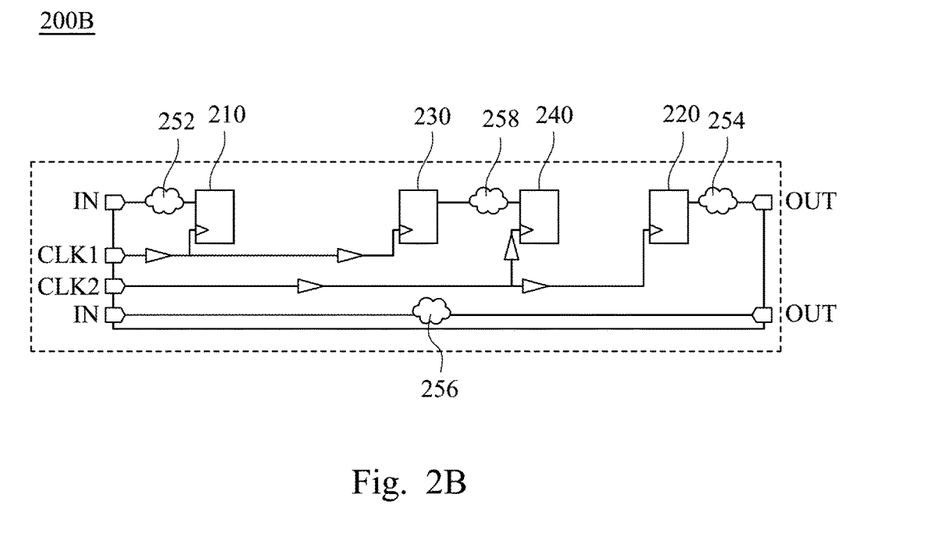
FIG. 2B, FIG. 2D, and FIG. 2F depict schematic diagrams of second netlists according to embodiments of this invention.

FIG. 2A depicts a schematic diagram of a first netlist 200A according to one embodiment of this invention, and FIG. 2B depicts a schematic diagram of a second netlist according to one embodiment of this invention. A description is provided with reference to FIG. 2A and FIG. 2B and also to FIG. 1. In one embodiment, the processor 120 is configured to read the first netlist 200A and execute the following operations to generate a second netlist 200B. First, the processor 120 extracts a first sub-netlist and a second sub-netlist from the first netlist 200A. The first sub-netlist is between an input IN and an initial-stage clock multi-vibrator 210 (including a logic element between the input IN and the initial-stage clock multi-vibrator 210, such as a logic element 252 shown in FIG. 2B). The second sub-netlist is between a final-stage clock multi-vibrator 220 and an output OUT (including a logic element between the final-stage clock multi-vibrator 220 and the output OUT, such as a logic element 254 shown in FIG. 2B). Second, the processor 120 extracts a third sub-netlist from the first netlist 200A. The third sub-netlist is between the input IN and the output OUT (including a logic element between the input IN and the output OUT, such as a logic element 256 shown in FIG. 2B). Third, the processor 120 extracts a fourth sub-netlist from the first netlist 200A. The fourth sub-netlist is between a first clock multi-vibrator 230 and a second clock multi-vibrator 240 (including a logic element between the first clock multi-vibrator 230 and the second clock multi-vibrator 240, such as a logic element 258 shown in FIG. 2B). The first clock multi-vibrator 230 is a front-stage clock multi-vibrator of the second clock multi-vibrator 240. The first clock multi-vibrator 230 is coupled to a first clock input CLK1, and the second clock multi-vibrator 240 is coupled to a second clock input CLK2.

Fourth, the processor 120 extracts a fifth sub-netlist from the first netlist 200A. The fifth sub-netlist is between the first clock input CLK1 and the initial-stage clock multi-vibrator 210 (including a logic gate between the first clock input CLK1 and the initial-stage clock multi-vibrator 210, such as a delayer shown in FIG. 2B). Fifth, the processor 120 extracts a sixth sub-netlist from the first netlist 200A. The sixth sub-netlist is between the second clock input CLK2 and the final-stage clock multi-vibrator 220 (including logic gates between the second clock input CLK2 and the final-stage clock multi-vibrator 220, such as delayers shown in FIG. 2B). Sixth, the processor 120 extracts a seventh sub-netlist from the first netlist 200A. The seventh sub-netlist is between the first clock input CLK1 and the first clock multi-vibrator 230 (including logic gates between the first clock input CLK1 and the first clock multi-vibrator 230, such as delayers shown in FIG. 2B). Seventh, the processor 120 extracts an eighth sub-netlist from the first netlist 200A. The eighth sub-netlist is between the second clock input CLK2 and the second clock multi-vibrator 240 (including logic gates between the second clock input CLK2 and the second clock multi-vibrator 240, such as delayers shown in FIG. 2B). Finally, the processor 120 generates the second netlist 200B (as shown in FIG. 2B) based on netlists extracted and the logic elements and logic gates corresponding to the netlists extracted. In some embodiments, as shown in FIG. 2A and FIG. 2B, each of the initial-stage clock multi-vibrator 210, the final-stage clock multi-vibrator 220, the first clock multi-vibrator 230, and the second clock multi-vibrator 240 may be implemented by using a flip-flop. However, the present invention is not limited in this regard.

Figure 2C:
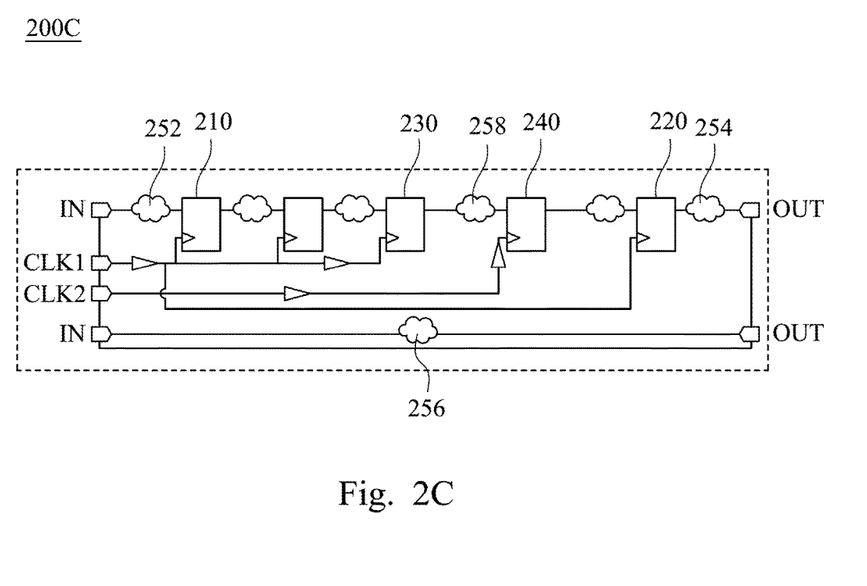
Figure 2D:
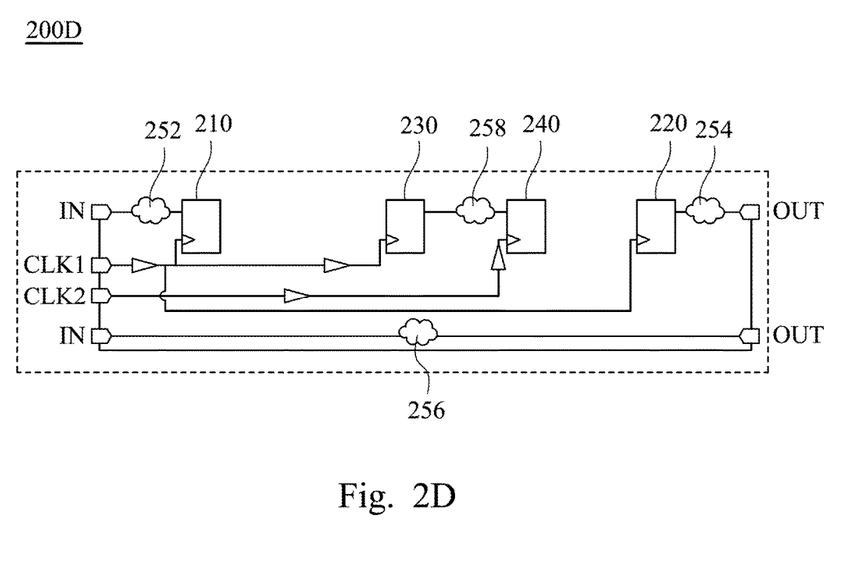
Figure 2E:
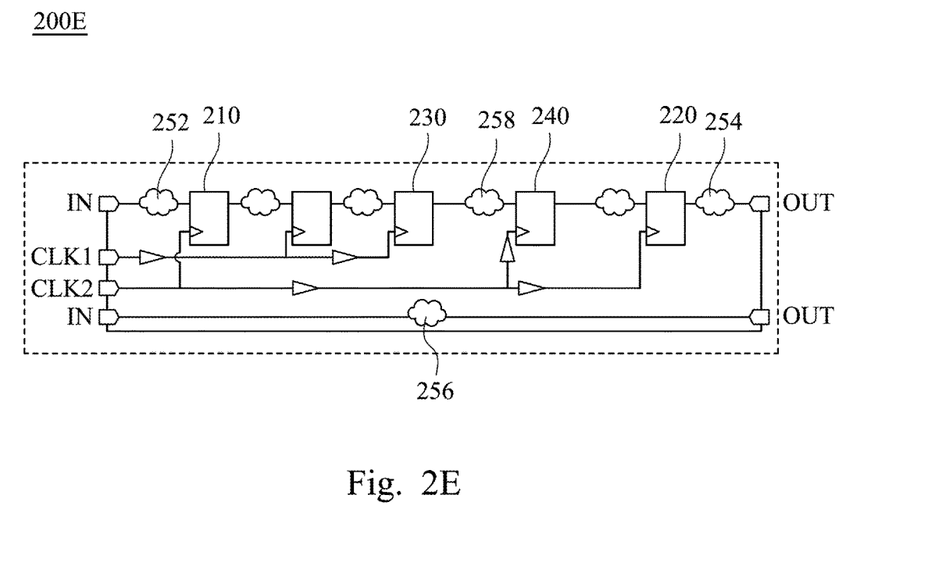

FIG. 2C and FIG. 2E depict schematic diagrams of first netlists according to embodiments of this invention. It is noted that the first netlists according to the embodiments of the present invention are not limited to the first netlist 200A, a first netlist 200C, and a first netlist 200E depicted in FIG. 2A, FIG. 2C, and FIG. 2E, and a description is provided with reference to the above embodiments only by way of examples. A description is provided with reference to FIG. 2C and also to FIG. 1. A difference between the first netlist 200C and the first netlist 200A shown in FIG. 2A is that a first clock input CLK1 of the first netlist 200C is directly connected the final-stage clock multi-vibrator 220 and a second clock input CLK2 of the first netlist 200C is not connected to the final-stage clock multi-vibrator 220. Hence, owing to the difference of connection relationship, the processor 120 extracts a sixth sub-netlist from the first netlist 200C shown in FIG. 2C. The sixth sub-netlist is between the first clock input CLK1 and the final-stage clock multi-vibrator 220. In addition, a description is provided with reference to FIG. 2E and also to FIG. 1. A difference between the first netlist 200E and the first netlist 200A shown in FIG. 2A is that a second clock input CLK2 of the first netlist 200E is directly connected to the initial-stage clock multi-vibrator 210 and a first clock input CLK1 of the first netlist 200E is not connected to the initial-stage clock multi-vibrator 210. Hence, owing to the difference of connection relationship, the processor 120 extracts a fifth sub-netlist from the first netlist 200E shown in FIG. 2E. The fifth sub-netlist is between the second clock input CLK2 and the initial-stage clock multi-vibrator 210. In summary, the first clock input CLK1 is connected to the initial-stage clock multi-vibrator 210 and the final-stage clock multi-vibrator 220 at the same time in the first netlist 200C shown in FIG. 2C. In addition, the second clock input CLK2 is connected to the initial-stage clock multi-vibrator 210 and the final-stage clock multi-vibrator 220 at the same time in the first netlist 200E shown in FIG. 2E.

Figure 2F:
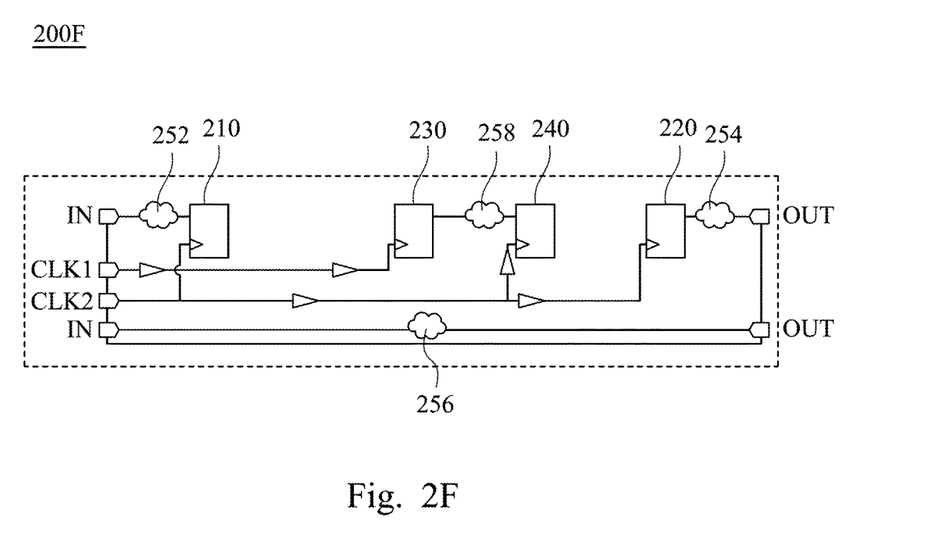

FIG. 2D and FIG. 2F are schematic diagrams of second netlists according to embodiments of this invention. It is noted that the second netlists according to the embodiments of the present invention are not limited to the second netlist 200B, a second netlist 200D, and a second netlist 200F depicted in FIG. 2B, FIG. 2D, and FIG. 2F, and a description is provided with reference to the above embodiments only by way of examples. FIG. 2D depicts the second netlist 200D corresponding to the first netlist 200C shown in FIG. 2C, and FIG. 2F depicts the second netlist 200F corresponding to the first netlist 200E shown in FIG. 2E.

With additional reference to FIG. 1, in one embodiment, the first netlist 112 comprises a main netlist and a secondary netlist, and the processor 120 is configured to determine whether an input clock received by a clock multi-vibrator in the secondary netlist is the same as an input clock received by the first clock multi-vibrator in the main netlist or not based on the first netlist 112. The clock multi-vibrator is coupled to the first clock multi-vibrator.

Figure 3A:
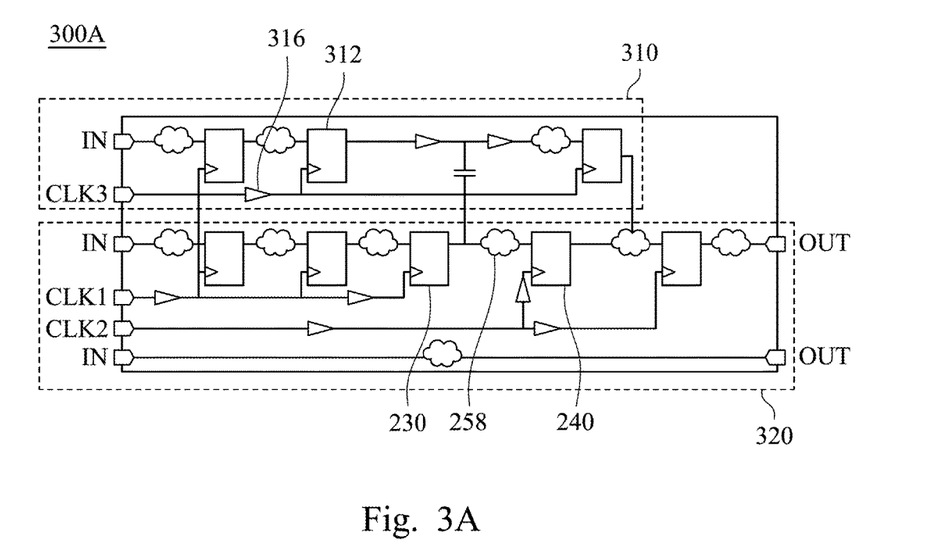
FIG. 3A, FIG. 3C, and FIG. 3E depict schematic diagrams of first netlists according to embodiments of this invention.
Figure 3B:
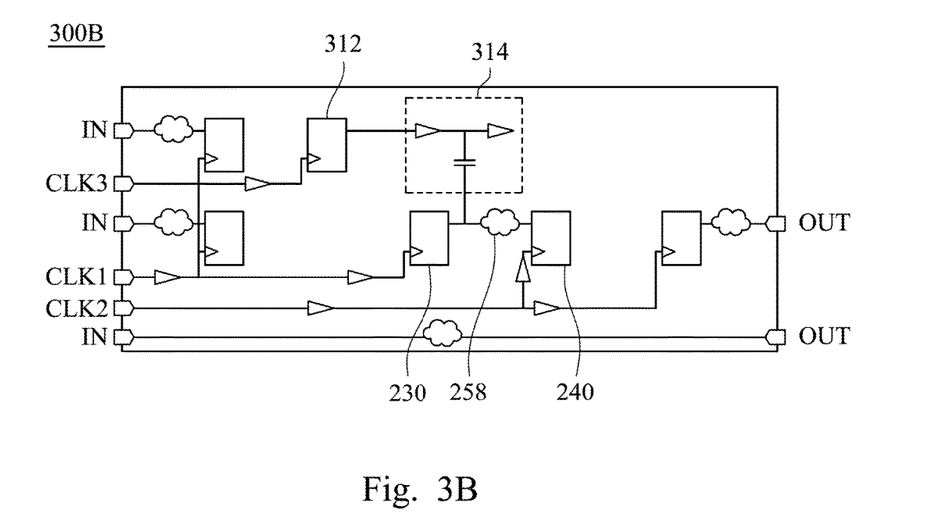
FIG. 3B, FIG. 3D, and FIG. 3F depict schematic diagrams of second netlists according to embodiments of this invention.

A description is provided with reference to FIG. 3A, FIG. 3B and also to FIG. 1. FIG. 3A depicts a schematic diagram of a first netlist 300A according to one embodiment of this invention, and FIG. 3B depicts a schematic diagram of a second netlist 300B according to one embodiment of this invention. As shown in FIG. 3A, in the first netlist 300A, an input clock (generated by a third clock input CLK3 shown in FIG. 3A, FIG. 3B) received by a clock multi-vibrator 312 (serve as a drive circuit) of a secondary netlist 310 is different from an input clock (generated by a first clock input CLK1 shown in FIG. 3A, FIG. 3B) received by the first clock multi-vibrator 230 of a main netlist 320. The clock multi-vibrator 312 is coupled to the first clock multi-vibrator 230. Hence, when the processor 120 determines that the input clock CLK3 received by the clock multi-vibrator 312 of the secondary netlist 310 is different from the input clock CLK1 received by the first clock multi-vibrator 230 of the main netlist 320, the processor 120 first executes the above operations as shown in FIG. 2A and FIG. 2B to extract the netlists correspondingly. After that, the processor 120 extracts a ninth sub-netlist from the first netlist 300A. The ninth sub-netlist is between the first clock multi-vibrator 230 of the main netlist 320 and the clock input CLK3 connected to the clock multi-vibrator 312 of the secondary netlist 310 (such as a delayer, the clock multi-vibrator 312, a logic element 314 shown in FIG. 3B).

Figure 3C:
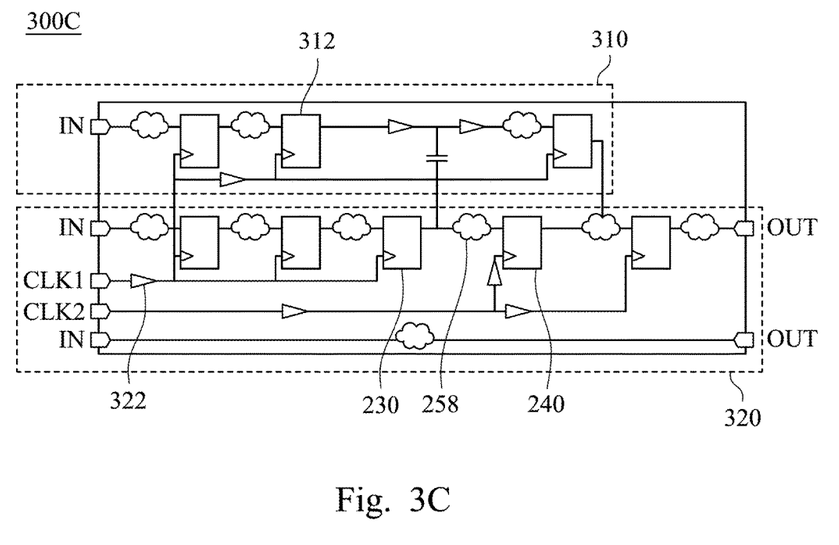
Figure 3D:
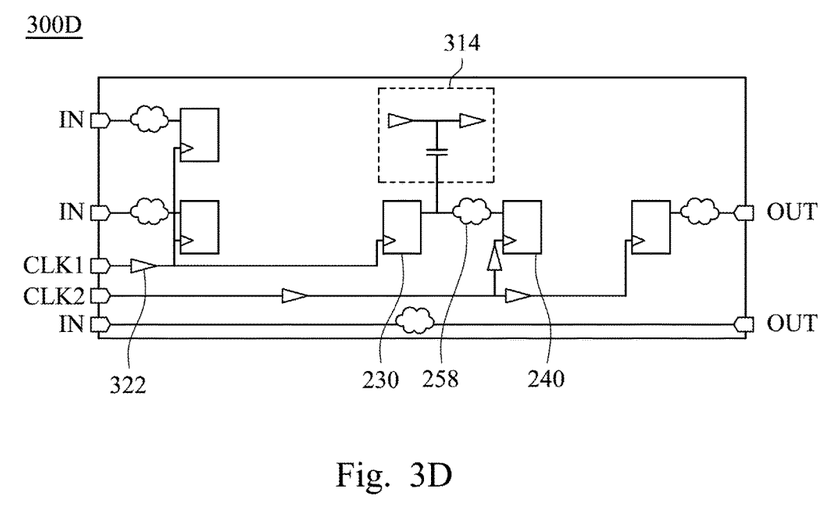

A description is provided with reference to FIG. 3C, FIG. 3D and also to FIG. 1. FIG. 3C depicts a schematic diagram of a first netlist 300C according to one embodiment of this invention, and FIG. 3D depicts a schematic diagram of a second netlist 300D according to one embodiment of this invention. In still another embodiment, as shown in FIG. 3C, an input clock received by the clock multi-vibrator 312 (serve as a drive circuit) of the secondary netlist 310 is the same as an input clock received by the first clock multi-vibrator 230 of the main netlist 320 (both are generated by a first clock input CLK1 shown in FIG. 3C and FIG. 3D, and a difference between a delay time of the input clock received by the clock multi-vibrator 312 of the secondary netlist 310 and a delay time of the input clock received by the first clock multi-vibrator 230 of the main netlist 320 is lower than a predetermined threshold value) in the first netlist 300C. For example, the input clock received by the clock multi-vibrator 312 of the secondary netlist 310 and the input clock received by the first clock multi-vibrator 230 of the main netlist 320 are both input clocks generated by the first clock input CLK1 through a delayer 322. In this manner, the delay time corresponding to the input clock received by the clock multi-vibrator 312 will be similar to that corresponding to the input clock received by the first clock multi-vibrator 230. As a result, a difference of delay times between the two will be lower than the predetermined threshold value. Therefore, when the processor 120 determines that the input clock received by the clock multi-vibrator 312 of the secondary netlist 310 is the same as the input clock received by the first clock multi-vibrator 230 of the main netlist 320, the processor 120 first executes the above operations as shown in FIG. 2A and FIG. 2B to extract the netlists correspondingly. After that, the processor 120 extracts a tenth sub-netlist from the first netlist 300C. The tenth sub-netlist is between the clock multi-vibrator 312 and the first clock multi-vibrator 230, and does not comprise the clock multi-vibrator 312 (such as the logic element 314 shown in FIG. 3D).

Figure 3E:
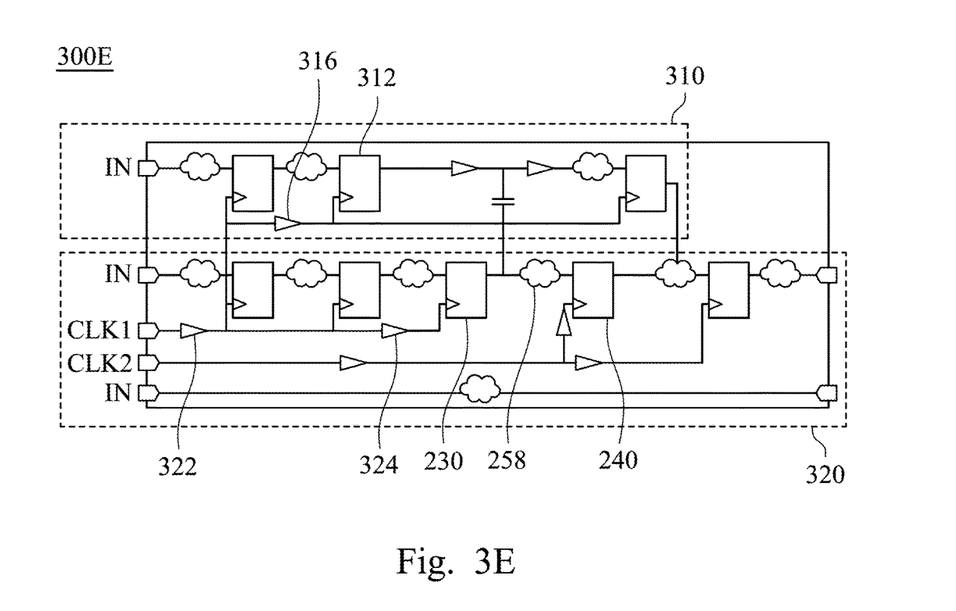
Figure 3F:
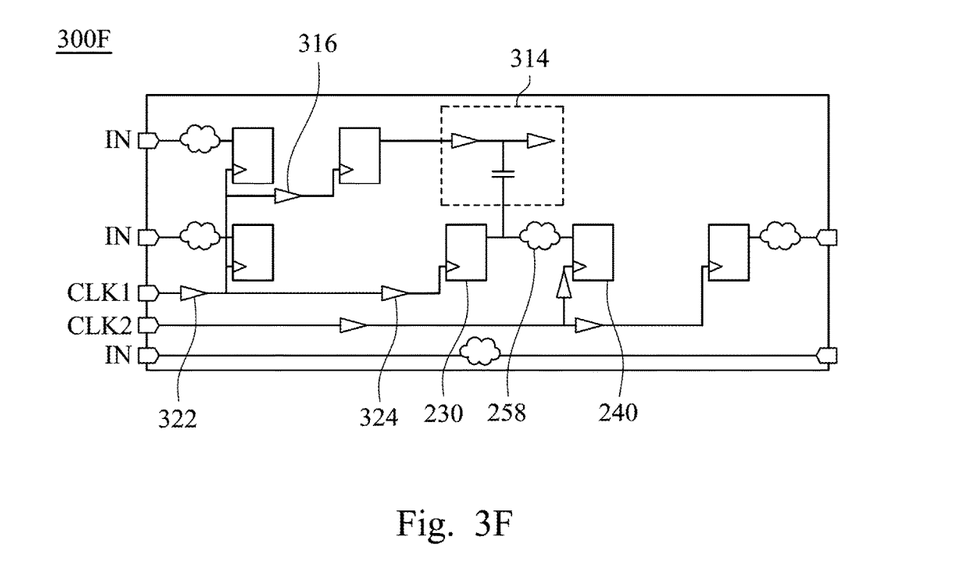

A description is provided with reference to FIG. 3E, FIG. 3F and also to FIG. 1. FIG. 3E depicts a schematic diagram of a first netlist 300E according to one embodiment of this invention, and FIG. 3F depicts a schematic diagram of a second netlist 300F according to one embodiment of this invention. In one embodiment, as shown in FIG. 3E, an input clock received by the clock multi-vibrator 312 (serve as a drive circuit) of the secondary netlist 310 is different from an input clock received by the first clock multi-vibrator 230 of the main netlist 320 (both are provided by a first clock input CLK1, but a difference between a delay time of the input clock received by the clock multi-vibrator 312 of the secondary netlist 310 and a delay time of the input clock received by the first clock multi-vibrator 230 of the main netlist 320 is higher than a predetermined threshold value) in the first netlist 300E. For example, the input clock received by the clock multi-vibrator 312 of the secondary netlist 310 is generated by the first clock input CLK1 through the delayer 322 and a delayer 316. The input clock received by the first clock multi-vibrator 230 of the main netlist 320 is generated by the first clock input CLK1 through the delayer 322 and a delayer 324. In this manner, the delay time corresponding to the input clock received by the clock multi-vibrator 312 will be different from that corresponding to the input clock received by the first clock multi-vibrator 230. As a result, a difference of delay times between the two will be higher than the predetermined threshold value. Therefore, when the processor 120 determines that the input clock received by the clock multi-vibrator 312 of the secondary netlist 310 is different from the input clock received by the first clock multi-vibrator 230 of the main netlist 320, the processor 120 is configured to execute the above operations as shown in FIG. 3A and FIG. 3B to extract the netlists correspondingly.

In another embodiment, a difference between a delay time of an input clock received by the clock multi-vibrator 312 of the secondary netlist 310 and a delay time of an input clock received by the first clock multi-vibrator 230 of the main netlist 320 may be estimated through the following relationship:

$$\max\left\{\left(\frac{D2}{D1+D2}\right), \left(\frac{D3}{D1+D3}\right)\right\}.$$

D1 represents a delay time corresponding to the delayer 322. D2 represents a delay time corresponding to the delayer 316. D3 represents a delay time corresponding to the delayer 324. Hence, when the above relationship is higher than a predetermined threshold value, the processor 120 determines that the input clock received by the secondary netlist 310 is different from the input clock received by the first clock multi-vibrator 230 of the main netlist 320. Conversely, the processor 120 determines that the input clock received by the secondary netlist 310 is the same as the input clock received by the first clock multi-vibrator 230 of the main netlist 320. It should be understood that the above embodiment is only used for illustrating a feasible calculation method for the difference between the delay time of the input clock received by the clock multi-vibrator 312 of the secondary netlist 310 and the delay time of the input clock received by the first clock multi-vibrator 230 of the main netlist 320, and the present invention is not limited in this regard. For example, numbers and disposition positions of delayers and delay times corresponding to the delayers may be correspondingly adjusted depending on practical needs.

Figure 4:
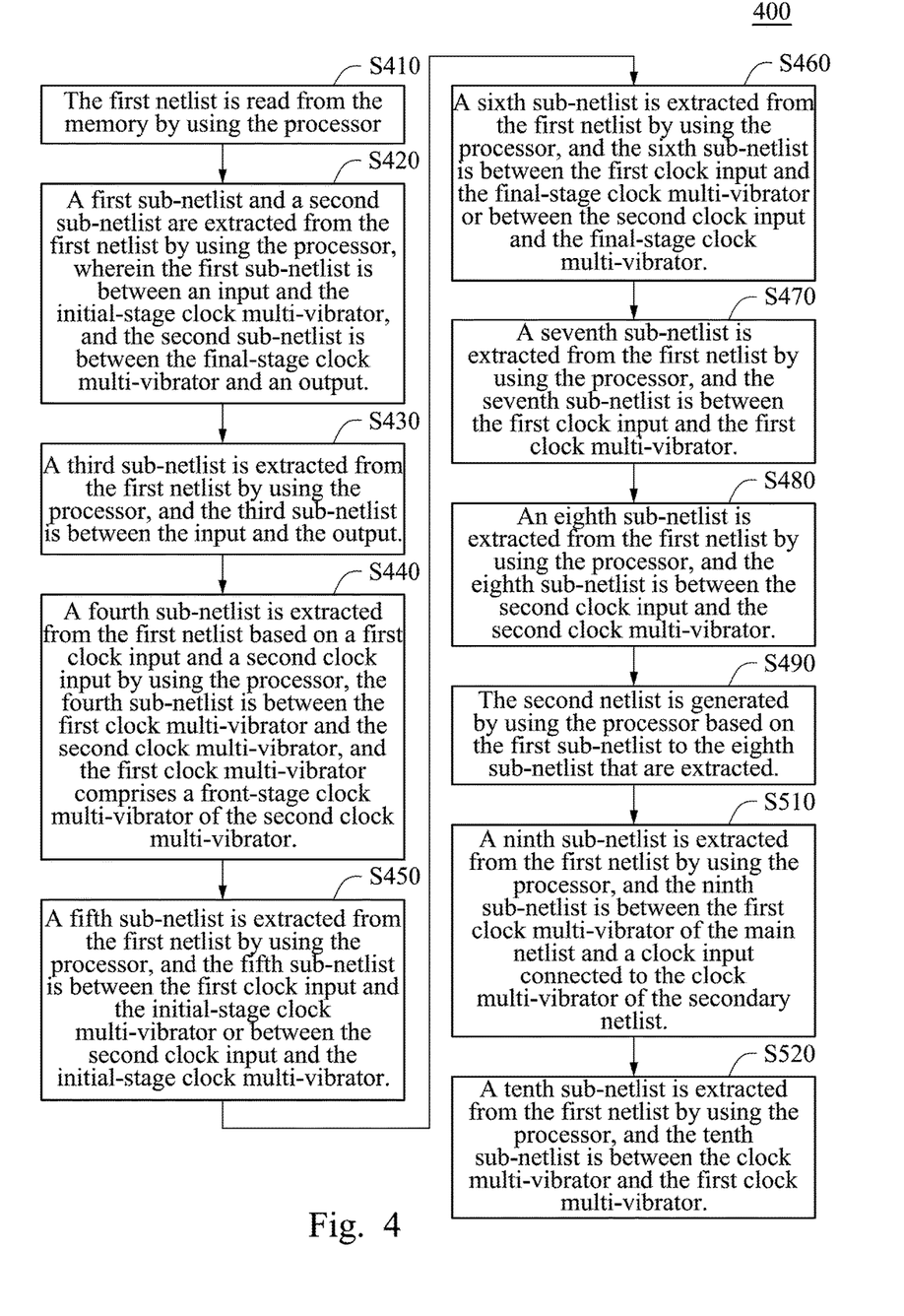
FIG. 4 depicts a flowchart of model-building method according to one embodiment of this invention.

FIG. 4 depicts a flowchart of model-building method 400 according to one embodiment of this invention. In one embodiment, the model-building method 400 may be implemented in the model-building system 100 shown in FIG. 1, but the present invention is not limited in this regard. In order to facilitate understanding of the model-building method 400, the model-building system 100 serving as a subject for illustrating the implementation of the model-building method 400 is provided as follows. A description is provided with reference to FIG. 4 and also to FIG. 1, and FIG. 2A to FIG. 2F. The model-building method 400 comprises the following steps.

S410: The first netlist 112 (such as the first netlist 200A, the first netlist 200C, or the first netlist 200E) is read from the memory 110 by using the processor 120.

S420: A first sub-netlist and a second sub-netlist are extracted from the first netlist 112 by using the processor 120. The first sub-netlist is between an input IN and the initial-stage clock multi-vibrator 210. The second sub-netlist is between the final-stage clock multi-vibrator 220 and an output OUT.

S430: A third sub-netlist is extracted from the first netlist 112 by using the processor 120. The third sub-netlist is between the input IN and the output OUT.

S440: A fourth sub-netlist is extracted from the first netlist 112 based on a first clock input CKL1 and a second clock input CLK2 by using the processor 120. The fourth sub-netlist is between the first clock multi-vibrator 230 and the second clock multi-vibrator 240, and the first clock multi-vibrator 230 comprises a front-stage clock multi-vibrator of the second clock multi-vibrator 240.

S450: A fifth sub-netlist is extracted from the first netlist 112 by using the processor 120. The fifth sub-netlist is between the first clock input CKL1 and the initial-stage clock multi-vibrator 210 or between the second clock input CLK2 and the initial-stage clock multi-vibrator 210.

S460: A sixth sub-netlist is extracted from the first netlist 112 by using the processor 120. The sixth sub-netlist is between the first clock input CKL1 and the final-stage clock multi-vibrator 220 or between the second clock input CLK2 and the final-stage clock multi-vibrator 220.

S470: A seventh sub-netlist is extracted from the first netlist 112 by using the processor 120. The seventh sub-netlist is between the first clock input CKL1 and the first clock multi-vibrator 230.

S480: An eighth sub-netlist is extracted from the first netlist 112 by using the processor 120. The eighth sub-netlist is between the second clock input CLK2 and the second clock multi-vibrator 240.

S490: The second netlist 114 is generated by using the processor 120 based on the first sub-netlist to the eighth sub-netlist that are extracted.

In one embodiment, the first netlist 112 comprises the secondary netlist 310 and the main netlist 320 (such as the first netlist 300A, the first netlist 300C, or the first netlist 300E), and the model-building method 400 can determine whether an input clock received by a clock multi-vibrator of the secondary netlist 310 is the same as an input clock received by the first clock multi-vibrator 230 of the main netlist 320 or not by executing the processor 120. A description is provided with reference to FIG. 3A, FIG. 3B and also to FIG. 1. In another embodiment, when it is determined that the input clock received by the clock multi-vibrator 312 of the secondary netlist 310 is different from the input clock received by the first clock multi-vibrator 230 of the main netlist 320, the processor 120 first executes the above steps S410 to S490 and executes the following step afterwards.

S510: The model-building method 400 then extracts a ninth sub-netlist from the first netlist 112 by using the processor 120. The ninth sub-netlist is between the first clock multi-vibrator 230 of the main netlist 320 and a clock input CLK3 connected to the clock multi-vibrator 312 of the secondary netlist 310 (such as a such as a delayer, the clock multi-vibrator 312, a logic element 314 shown in FIG. 3B).

A description is provided with reference to FIG. 3C, FIG. 3D and also to FIG. 1. In still another embodiment, when it is determined that the input clock received by the clock multi-vibrator 312 of the secondary netlist 310 is the same as the input clock received by the first clock multi-vibrator 230 of the main netlist 320, the processor 120 first executes the above steps S410 to S490 and executes the following step afterwards. S520: the model-building method 400 then extracts a tenth sub-netlist from the first netlist 112 by using the processor 120. The tenth sub-netlist is between the clock multi-vibrator 312 and the first clock multi-vibrator 230, and does not comprise the clock multi-vibrator 312 (such as the logic element 314 shown in FIG. 3D).

In one embodiment, the model-building method 400 can determine whether or not a difference between a delay time of the input clock received by the clock multi-vibrator 312 of the secondary netlist 310 and a delay time of the input clock received by the first clock multi-vibrator 230 of the main netlist 320 is higher than a predetermined threshold value in the first netlist 300C by executing the processor 120. A description is provided with reference to FIG. 3E, FIG. 3F and also to FIG. 1. For example, the model-building method 400 can perform estimation based on the following relationship by executing the processor 120:

$$\max\left\{\left(\frac{D2}{D1+D2}\right), \left(\frac{D3}{D1+D3}\right)\right\}. \qquad 5$$

D1 represents a delay time corresponding to the delayer 322. D2 represents a delay time corresponding to the delayer 316. D3 represents a delay time corresponding to the delayer 324. Hence, when the above relationship is higher than the predetermined threshold value, it is determined that the input clock received by the secondary netlist 310 is different from the input clock received by the first clock multi-vibrator 230 of the main netlist 320. Conversely, it is determined that the input clock received by the secondary netlist 310 is the same as the input clock received by the first clock multi-vibrator 230 of the main netlist 320. It should be understood that the above embodiment is only used for illustrating a feasible calculation method for the difference between the delay time of the input clock received by the clock multi-vibrator 312 of the secondary netlist 310 and the delay time of the input clock received by the first clock multi-vibrator 230 of the main netlist 320, and the present invention is not limited in this regard. For example, numbers and disposition positions of delayers and delay times corresponding to the delayers may be correspondingly adjusted depending on practical needs.

According to the above embodiments, the model-building method and model-building system according to the present invention extract the netlists corresponding to the initial-stage clock multi-vibrator and the final-stage clock multi-vibrator based on the input and the output, and extract the netlists corresponding to the first clock multi-vibrator and the second clock multi-vibrator based on different clock inputs so as to improve the traditional interface logic model. As a result, the model-building method and model-building system according to the present invention can effectively improve the traditional interface logic model (that is, the improved interface logic model can present features and characteristics of multiple clock inputs) so as to support accurate and efficient static timing analysis.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A model-building method applied to a model-building system, wherein the model-building system comprises a memory and a processor, and the model-building method comprises:

reading a first netlist from the memory by using the processor;

extracting a first sub-netlist and a second sub-netlist from the first netlist by using the processor, wherein the first sub-netlist is between an input and an initial-stage clock multi-vibrator, the second sub-netlist is between a final-stage clock multi-vibrator and an output;

extracting a third sub-netlist from the first netlist by using the processor, the third sub-netlist being between the input and the output;

extracting a fourth sub-netlist from the first netlist by using the processor, the fourth sub-netlist being between a first clock multi-vibrator and a second clock multi-vibrator, wherein the first clock multi-vibrator is a front-stage clock multi-vibrator of the second clock multi-vibrator, the first clock multi-vibrator is coupled to a first clock input, and the second clock multi-vibrator is coupled to a second clock input;

extracting a fifth sub-netlist from the first netlist by using the processor, the fifth sub-netlist being between the first clock input and the initial-stage clock multi-vibrator or between the second clock input and the initial-stage clock multi-vibrator;

extracting a sixth sub-netlist from the first netlist by using the processor, the sixth sub-netlist being between the first clock input and the final-stage clock multi-vibrator or between the second clock input and the final-stage clock multi-vibrator;

extracting a seventh sub-netlist from the first netlist by using the processor, the seventh sub-netlist being between the first clock input and the first clock multi-vibrator;

extracting an eighth sub-netlist from the first netlist by using the processor, the eighth sub-netlist being between the second clock input and the second clock multi-vibrator; and generating a second netlist based on the first sub-netlist to the eighth sub-netlist that are extracted by using the processor.

2. The model-building method of claim 1, wherein the first netlist comprises a main netlist and a secondary netlist, and the model-building method further comprises:

determining whether an input clock received by a clock multi-vibrator of the secondary netlist is the same as an input clock received by the first clock multi-vibrator of the main netlist or not by using the processor, wherein the clock multi-vibrator is coupled to the first clock multi-vibrator.

3. The model-building method of claim 2, wherein when the processor determines that the input clocks are not the same, the processor extracts a ninth sub-netlist from the first netlist, the ninth sub-netlist is between the first clock multi-vibrator of the main netlist and a clock input connected to the clock multi-vibrator of the secondary netlist.

4. The model-building method of claim 2, wherein when the processor determines that the input clocks are the same, the processor extracts a tenth sub-netlist from the first netlist, the tenth sub-netlist is between the clock multi-vibrator of the secondary netlist and the first clock multi-vibrator of the main netlist.

5. The model-building method of claim 1, wherein each of the initial-stage clock multi-vibrator, the final-stage clock multi-vibrator, the first clock multi-vibrator, and the second clock multi-vibrator comprises a flip-flop.

6. A model-building system, comprising:

a memory configured to store a first netlist and a second netlist; and a processor configured to read the first netlist from the memory, wherein the processor is configured to execute the following operations to generate the second netlist:

extracting a first sub-netlist and a second sub-netlist from the first netlist, wherein the first sub-netlist is between an input and an initial-stage clock multi-vibrator, the second sub-netlist is between a final-stage clock multi-vibrator and an output;

extracting a third sub-netlist from the first netlist, the third sub-netlist being between the input and the output;

extracting a fourth sub-netlist from the first netlist, the fourth sub-netlist being between a first clock multi-vibrator and a second clock multi-vibrator, wherein the first clock multi-vibrator is a front-stage clock multi-vibrator of the second clock multi-vibrator, the first clock multi-vibrator is coupled to a first clock input, and the second clock multi-vibrator is coupled to a second clock input;

extracting a fifth sub-netlist from the first netlist, the fifth sub-netlist being between the first clock input and the initial-stage clock multi-vibrator or between the second clock input and the initial-stage clock multi-vibrator;

extracting a sixth sub-netlist from the first netlist, the sixth sub-netlist being between the first clock input and the final-stage clock multi-vibrator or between the second clock input and the final-stage clock multi-vibrator;

extracting a seventh sub-netlist from the first netlist, the seventh sub-netlist being between the first clock input and the first clock multi-vibrator; and extracting an eighth sub-netlist from the first netlist, the eighth sub-netlist being between the second clock input and the second clock multi-vibrator.

7. The model-building system of claim 6, wherein the first netlist comprises a main netlist and a secondary netlist, and the processor is configured to determine whether an input clock received by a clock multi-vibrator of the secondary netlist is the same as an input clock received by the first clock multi-vibrator of the main netlist or not based on the first netlist, wherein the clock multi-vibrator is coupled to the first clock multi-vibrator.

8. The model-building system of claim 7, wherein when the processor determines that the input clocks are not the same, the processor extracts a ninth sub-netlist from the first netlist, the ninth sub-netlist is between the first clock multi-vibrator of the main netlist and a clock input connected to the clock multi-vibrator of the secondary netlist.

9. The model-building system of claim 7, wherein when the processor determines that the input clocks are the same, the processor extracts a tenth sub-netlist from the first netlist, the tenth sub-netlist is between the clock multi-vibrator of the secondary netlist and the first clock multi-vibrator of the main netlist.

10. The model-building system of claim 6, wherein each of the initial-stage clock multi-vibrator, the final-stage clock multi-vibrator, the first clock multi-vibrator, and the second clock multi-vibrator comprises a flip-flop.

* * * * *